Aug. 2, 1955   F. FESSLER   2,714,573
PROCESS FOR RECOVERING VOLATILE FLAVORS
Filed Oct. 14, 1950
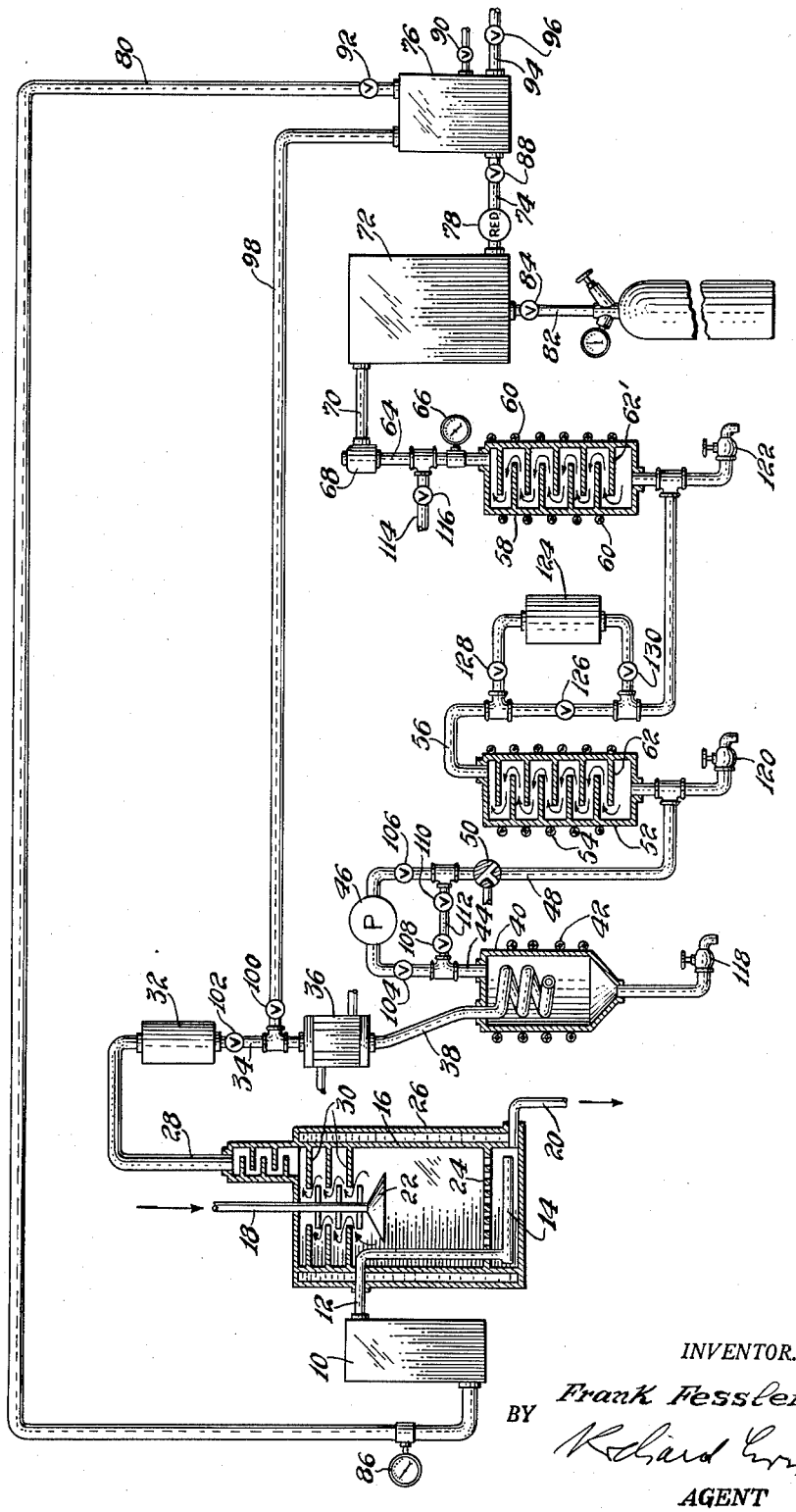
INVENTOR.
Frank Fessler
BY
Richard Graf
AGENT

2,714,573

PROCESS FOR RECOVERING VOLATILE FLAVORS

Frank Fessler, Newark, N. J., assignor, by mesne assignments, of 100/995 to James J. Gustaf, East Orange, 100/995 to Patrick F. McDevitt, Jersey City, 100/995 to Edwin W. Phillips, Millburn, 50/995 to Charles W. Hutchinson, Bayonne, 50/995 to Arthur J. Blake, Jersey City, 100/995 to Raymond J. Lamb, Ridgewood, 400/995 to Frank Fessler, Newark, and 95/995 to Richard Low, Newark, N. J.

Application October 14, 1950, Serial No. 190,188

4 Claims. (Cl. 202—39)

This invention relates to a process for the recovery of volatile flavors, such as the flavoring constituents of fruits, fruit juices, plant and herb extracts, etc.

The primary object of my invention is to generally improve the known methods of recovering volatile flavors and, more particularly, to increase the yield of the flavors and to cheapen the recovery of the same.

In food products and particularly in fresh fruits and freshly pressed fruit juices, the flavors are only present in extremely small amounts. Fruit flavors are so highly volatile that freshly pressed fruit juices lose most of their aroma when left in open containers for a few hours.

In the commercially used methods of processing fruit products, concentration and sterilisation is done by heating whereby the volatile fruit flavors are lost. This is a great drawback since the flavor of a fruit is one of its most characteristic and appreciated qualities. An important object of my invention is, therefore, to overcome this disadvantage. My invention aims at separating the volatile flavoring constituents from fresh fruit products to prevent the flavors from becoming lost during subsequent processing operations.

Another object of the present invention is to recover flavors while fresh fruit products are being processed, which flavors are otherwise lost.

A further object of my invention is to recover the flavors in a sufficient concentration so that they can be either reincorporated in the fruit products after their processing or used for other purposes.

Some volatile food flavors, for instance, coffee aroma, can withstand a temperature of 212° F. and more for prolonged periods of time. But the volatile fruit flavors, as a rule, are altered by elevated temperatures. A few among the latter, such as apple flavor and grape flavor, are able to withstand a temperature of 212° F. for a very short period of time without noticeable alteration. Most fruit flavors, however, are highly sensitive to heat so that alteration occurs when exposed to elevated temperatures only for a few seconds.

Prior methods for the recovery of volatile fruit flavors use either flash distillation at atmospheric pressure or vacuum distillation. Efforts have also been made to conduct evaporation or concentration in the presence and with the aid of inert gases.

Obviously, flash evaporation at atmospheric pressure is suitable only for the limited number of flavors which can withstand boiling for a short time.

Distillation under vacuum has the disadvantage that the losses of volatile flavors associated with noncondensible gases which are vented from the vacuum pump are high. This makes it nearly impossible to recover the flavor as a concentrated "essence." The term "essence" is defined in Patent No. 2,457,315 as the aqueous solution of the concentrated volatile flavors, consisting even when highly concentrated of almost pure water with a small amount of the very strong flavoring constituents.

The efforts to concentrate fruit juices with the aid of inert gases, such as nitrogen, carbon dioxide, etc., and to recover simultaneously the flavoring constituents have not succeeded in obtaining concentrated flavor essences. Gas blow through a fruit juice carries along both water vapor and flavor. The amount of volatile flavor in the original fruit juice is very small so that the quantity of flavor vapor carried by the gas is necessarily also very small. Whereas the gas is nearly saturated with water vapor at the processing temperature of the juice, the quantity of flavor vapor is far below the dew point. When the gas is cooled to 32° F., liquid water and ice precipitate until the dew point of the gas at 32° is reached. On the other hand, a portion only of the flavor carried by the gas can precipitate with the liquid water and ice because the amount of flavor vapor initially carried by the gas after passing through the fruit juice is far below saturation. The main portion of the flavor remains with the residual moisture as vapor in the gas.

One object of my invention is to overcome the disadvantages of the prior recovery systems.

Other objects will appear from the following description.

My invention is based on the following considerations and observations:

As stated above, fruit flavors are highly volatile so that fresh fruit juices lose their aroma within a few hours when left in open containers. I have found that nearly a complete loss of aroma occurs within a short time when gas, such as carbon dioxide or nitrogen, is bubbled or blown through fruit juices at temperatures as low as 120 to 130° F. under atmospheric pressure. It will be understood that the removal of fragrant constituents is accelerated by increasing the temperature and/or decreasing the gas pressure.

I have also found that most of the flavor precipitates from a flavor-carrying gas by cooling the latter below, preferably far below, the freezing point of water. However, freezing the gas below 32° F. involves the risk of flow stoppages by the formation of ice. According to my invention, this difficulty is avoided or at least greatly reduced by cooling the flavor and water vapor-carrying gas in several stages, precipitating flavor in each of a number of freezing zones, until in the last zone practically all of the remainder of the flavor is precipitated. I prefer to maintain a temperature slightly above the freezing point in the first zone (cooling zone), and a lower temperature in the following zones (freezing zones), whereby the temperature in each following freezing zone is lower than that in the immediately preceding zone.

According to another feature of my invention, the recovery of the flavor from a flavor-carrying gas by freezing is greatly improved by compressing the gas while it is frozen. Therefore, the temperature below the freezing point of water in the different freezing zones can be higher under compression than without and yet have the same precipitating effect.

For most efficient operation, I provide for the gas to pass, upon leaving the freezing zones, through activated charcoal, silica gel or any other adsorbents in order to remove any traces of flavor retained by the gas after freezing.

It is also desirable to pass the gas through a germ filter before the precipitation of the flavors in order to prevent contamination of the recovered essence by yeasts, molds, bacteria or spores which otherwise are introduced by the gas into the essence.

It will be seen that with my invention here disclosed, the process according to this invention is not intended for the concentration of original fruit juices, but for the separation of the flavors from the juices with the aid of a gas, such as air, inert gases, for instance, nitrogen, carbon dioxide, helium, etc., and the subsequent recovery of the flavors from the gas used. In view of its rather high water solubility, carbon dioxide is used under certain conditions only.

The process of this invention will be more readily understood by reference to the drawing showing diagrammatically an embodiment of the same.

Referring in detail to the drawing, a stream of gas which is used to strip freshly pressed fruit juice is preheated in a preheater 10 and then conducted by line 12 to a distributor 14 inside of a stripping tank 16 near the bottom of the latter. The juice is supplied to the stripping tank through line 18 either continuously or for batch operation. It is withdrawn through line 20. For continuous operation, the conduit 18 is provided with a device 22 to obtain even distribution over Raschig rings (not shown) supported by a perforated plate 24. In the embodiment selected for illustration, the gas is passed countercurrent to the fruit juice. The gas distributor 14 ensures uniform distribution over the whole cross section of the stripper.

The stripping tank may be heated by means of a hot water jacket 26.

The inside diameter of the stripping tank must be sufficiently large to ensure that the gas moves only slowly through the liquid to prevent or at least to reduce foaming.

After passing through the liquid, the gas carrying water vapor and volatile flavors leaves the stripping tank overhead through line 28. The top level of the liquid in the stripping tank must be a sufficient distance below the gas outlet. Baffles 30 are provided in the tank between the gas outlet and the liquid to prevent juice drops from being carried away with the gas. Juice drops are undesired because they contaminate the essence with sugar, pectin, etc. For juices which foam strongly, a liquid-vapor-separator is inserted in the line 28.

The pressure of the gas passing through the juice should not be high. The higher the pressure, the less vapor is carried away. It is sufficient to maintain just enough pressure over atmospheric pressure to make the gas bubble through the juice.

The stripping temperatures are never as high as would be detrimental to the flavors to be separated from the juice. The main advantage of flavor-stripping with the aid of gas is that it is done at any desired low temperature so that no flavor alteration due to heat can occur. Due to the low temperature used, the gas will not become saturated with water vapor, which will render the removal of water from the gas easier. Most flavors can be stripped without alteration between 125 to 140° F. In some instances, stripping at 100° F. and less is advantageous. More heat-resistant flavors may be removed by means of gas at temperatures of about 150 to 160° F. For batch operations for prolonged periods of time (over night), the stripping temperature should be quite low.

The line 28 conducts the gas carrying the water and flavor vapors to a germ filter 32 of any suitable construction from which the vapor mixture is passed through line 34 to a condenser 36. Condensate, noncondensed water vapor, the noncondensible gas and the volatile flavors are then introduced by line 38 into a vessel 40 which is surrounded by a coil 42 through which a cooling fluid circulates to maintain the vessel at a temperature of about 32 to 33° F. At this temperature under atmospheric pressure liquid water and some flavor precipitate from the gas.

A large portion of the flavor, together with the residual moisture, is carried by the gas through line 44 to a pump 46. This pump may be of a reciprocating type or any other kind which is suitable to build up pressure during the subsequent freezing.

The gas entering the pump is above the freezing point. Due to the compression of the gas, the temperature increases somewhat so that no liquid precipitation can occur while the gas is in the pump.

Line 48 which is equipped with a three-way valve 50 connects the pump 46 with a vessel 52 surrounded by a refrigerating coil 54 supplied with refrigerant to maintain the vessel 52 at a temperature below the freezing point of water. A temperature of 25 to 15° F. has in many cases been found to be suitable. At the low temperature, while at elevated pressure, ice and flavor crystallize out of the gas.

Line 56 conducts the gas into another freezing vessel 58 surrounded by a refrigerating coil 60 and cooled to as low a temperature as is needed to freeze most of remaining flavor out of the gas. Usually, a temperature between 10 and 0° F. is sufficiently low.

Instead of two freezing vessels, three or more may be used as well. In each following vessel a lower temperature is maintained than in the preceding vessel.

The freezing vessels and the conduits between them are suitably insulated. Electric resistance heaters may be provided to heat critical portions of the conduits in the event of becoming clogged due to ice formation.

Metal baffles 62 and 62' in the vessels 52 and 58, respectively, force the gas in the directions indicated by arrows. The freezing paths are sufficiently wide to avoid or at least to delay flow stoppages due to ice.

Besides the shown train of deep freezing vessels, it is useful to provide at least one spare set of such vessels which may be connected to the system if the train in operation becomes clogged, using the three-way valve 50 for the purpose of such occasional connections, and thus ensuring operation without breakdowns.

Upon leaving the vessel 58, the gas which is now practically free of water and flavor vapors enters line 64 which is equipped with a manometer 66 and a pressure check valve 68, the latter having the purpose of maintaining the desired pressure in the vessels 52 and 58.

The optimum pressure in the freezing zones depends on the kind of flavor to be separated. It varies between 2 and 3 atm. In some cases, the application of higher pressure is beneficial. However, even a compression below 1½ atm. greatly facilitites the precipitation of volatile flavors.

From the pressure check valve 68, the gas passes through line 70 into a gas tank 72 where it expands and from where it is introduced by line 74 into an adsorber 76. The line 74 is provided with a reducing valve 78. The adsorber is filled with granulated activated charcoal, silica gel or any other suitable adsorbents to remove the last traces of flavor from the gas.

From the adsorber 76, the gas is recycled through line 80 to the preheater 10.

The gas leaving the reducing valve 78 has just enough pressure to pass through the adsorber, the line 80, and the juice column in the stripping tank. If stripping below atmospheric pressure is desired, a vacuum pump may be placed between the stripping tank and the germ filter to suck the gas through the juice.

A fan inserted before the germ filter creates enough suction in the stripping tank so that the gas in the stripping zone, if desired, may be slightly below atmospheric pressure.

The gas used for the stripping is introduced into the system through line 82 which is equipped with a valve 84. Gas losses occur through the juice outlet conduit 20. They are indicated by a manometer 86 provided in the line 80 and are compensated by introducing additional gas through 82. At the beginning of the operation, air is removed from the system by closing the valve 88 in the line 74 and by opening the valve 90, whereupon the gas is introduced through 82, replacing the air which leaves through the valve 90.

It is advantageous to adsorb the last traces of flavor by means of activated charcoal or any other adsorbents because many fruit flavoring constituents, after alteration caused by heating, retain a very pleasant aroma which is worth being recovered, although different from the original odor. Another advantage is that the gas recycled to the preheater is freed of any flavor traces which may become altered in the preheater and may, when cooled and frozen out afterwards, spoil the essence.

Whenever flavors are recovered which are heat resistant, their recovery from the adsorbent may be carried out by steaming. The steaming, for instance, of charcoal is done from time to time only. If recovery by steaming is desired, separate charcoal has to be used for each flavor because charcoal will retain a certain amount of the flavor when steamed at 215 to 220° F.

For the steaming of the charcoal, the valves 88 and 92 are closed, allowing steam to enter the adsorber through line 94 after opening the valve 96. The steam leaves the adsorber through line 98. The valve 100 is opened to allow steam to enter the condenser 36, whereas the valve 102 is closed to prevent steam from entering the germ filter 32 and the stripping tank 16. The pump 46 can be bypassed by closing the valves 104 and 106 and opening the valves 108 and 110 in line 112. The cooling and freezing of the flavor-carrying steam is done as explained above, but without compression in the freezing vessels 52 and 58.

After leaving the last freezing vessel, noncondensible gas is vented through line 114 by opening valve 116.

From the foregoing, it will be understood that the flavors recovered from the gas used by cooling and freezing, the recovery being aided by compression, remain with the condensed water in the vessel 40, and together with ice in the vessels 52 and 58. By shutting off the refrigerating coils, the ice in the deep freezing vessels is liquified. The vessels can be emptied through cocks 118, 120 and 122. The essences withdrawn from the different vessels may be blended or kept separately.

If the stripping temperature in the stripping tank is low, that is, under 100° F., the condenser 36 may be omitted.

When more than two deep freezing vessels are used, the deep freezing is done in as many stages, the temperatures being maintained, for instance, as follows: 1st stage 25 to 15° F.; 2nd stage 10 to 5° F.; 3rd stage 0° F. or as low below zero as required to remove all or most of the essence from the gas.

I also provide that the gas compression according to my invention be applied in several stages by using more than one compression pump.

For flavors resistant to elevated temperatures for short periods, sterilisation by heat instead of germ filtration can be used by conducting the gas coming from the stripping tank through a jacketed sterilizer heated by steam.

It is also possible to pass the gas, after leaving the stripping tank, through a washer filled with a solution of an odorless food disinfectant, and then, for the removal of drops of the disinfectant from the gas, through a centrifugal liquid-gas-separator.

I prefer to use nitrogen as a stripping gas. Helium is too expensive for commercial purposes. Carbon dioxide may be used when saturation of the stripped juice with this gas is desired.

Reverting to the drawing, I prefer to introduce in the lines 48 and 56 a so-called wash bottle which is designed to add moisture to the vapor-carrying gas during freezing if this is desired. In the drawing, such a bottle designated 124 is shown in the line 56. By partially closing the valve 126 and partially opening the valves 128 and 130, any quantity of gas may be passed through the bottle 124.

My process aiming at the recovery of extremely dilute flavor vapors from any noncondensible gas, in the presence of water vapor, by cooling and deep freezing in stages, without or in conjunction with compression, can most usefully be applied to the recovery of fruit flavors from air.

In the processing of fruits, most pleasant odors develop when fruits are heated in kettles to produce preserves, jams, marmalades, etc. These odors are caused by fruit flavors. Although, due to heat alterations, they are not identical with the fresh fruit flavors, the aroma is pleasant enough to justify its recovery.

The air in and above the fruit processing kettles is a noncondensible gas carrying water and flavor vapors. Such air is withdrawn from closed kettles or open kettles, which are provided with a hood, and is pumped, in using part of the equipment above described, to the germ filter 32. From there the flavor-carrying air passes through the condenser 36, the vessel 40 and the pump 46 into the deep freezing vessels. After leaving the last freezing vessel, the air may be vented through 114 or led into the activated charcoal adsorber, venting being done in the latter case upon passing through the adsorber.

In order to avoid long lines for conducting the air carrying the flavors from the processing kettles to the apparatus, I provide small adsorbers with activated charcoal near the kettles and conduct the flavor-carrying air through such adsorbers. The dilute essence obtained by steaming these adsorbers can be concentrated in the apparatus by air or gas stripping and subsequent cooling and freezing.

The following examples will serve to further illustrate my invention, but it is to be understood that this invention is not limited to the examples given.

EXAMPLE 1

*Recovery of strawberry flavor*

About half of the stripping tank of an apparatus similar to that shown is filled with strawberry juice for batch operation. Gas stripping with nitrogen is started at a temperature of about 80° F. During the blowing of nitrogen, the temperature is very slowly increased to about 130° F. Progress is controlled by opening from time to time the cock of a test tube provided in the line between the stripping tank and the germ filter. As soon as no more strawberry flavor odor is noticeable, the stripping is completed.

In the cooling vessel, which corresponds to the vessel 40 of the apparatus of the drawing, a temperature of about 33° F. is maintained. In the last of three freezing vessels, the temperature is kept at about 0° F. In the two freezing vessels between the cooling vessel and the last freezing vessel the temperature is maintained between 25 and 10° F. The pressure in the freezing vessels is about 1.5 atm. The recovery by freezing is controlled by opening the cock of a test tube in the line between the last freezing vessel and the gas tank. In the event that a strong odor of strawberry flavor is still noticeable, the temperatures in the freezing vessels are decreased or the pressure therein is increased. If neither is possible, a small part of the gas is passed through a wash bottle like that which is designated 124 so that additional moisture may enter into the freezing vessels. The precipitation of ice from additional water vapors at this stage improves the recovery of the flavor, but the moisture addition must be kept low not to further flow stoppages by ice formation. If flow stoppage due to the formation of ice occurs, it is indicated by manometers provided on the freezing vessels, in which event the frozen train is disconnected at a provided three-way valve, and a spare train is connected.

Upon completion of the gas stripping operation, the refrigeration is shut off, and after liquefaction, the contents of the cooling and freezing vessels are withdrawn and blended. The result is a most concentrated strawberry essence.

For continuous operation, strawberry juice is introduced into the stripping tank (in this case about one half filled with Raschig rings) until a showglass indicates that about one fifth or one fourth of the tank is filled with juice. The gas stripping is started the same way as for batch operation. The temperature is slowly increased from 80° F. to 130° F., and nitrogen is passed through the juice until no flavor odor is noticeable in the test tube in the line between the stripping tank and the germ filter. Now the juice inlet is partially opened and additional juice enters the tank until the latter is about half full. The juice outlet in the stripping tank is partially open and stripped juice is withdrawn. The latter must be free of flavor odor. If odor in the leaving juice is still noticeable, the outlet must be closed again. By properly adjusting the cocks in the inlet and outlet lines, an equilibrium is finally reached where just as much fresh juice enters the tank as stripped juice leaves.

EXAMPLE 2

Recovery of grape flavor

The operations are the same as those indicated above, except that the stripping temperature is increased to 160° F. Best recovery results are obtained in freezing vessels at a pressure of 3 atmospheres or more at a temperature in the last freezing vessel of about 10 to 5° F. By adding additional moisture during the deep freezing, excellent results are also achieved at a pressure as low as 10 in. water, but the temperature in the last freezing vessel has to be kept around 5 to 0° F.

EXAMPLE 3

Recovery of apple flavor

The operations are the same as those employed for grape flavor. Freezing below 0° F. in the last freezing vessel makes it possible to add such small quantities of additional moisture that risk of ice stoppage is almost nil.

EXAMPLE 4

Recovery of pineapple flavor

The operations are similar to those indicated in Example 1. The temperature in the stripping tank is about 80° F. in the beginning and 120° F. at the end. The temperature in the last freezing vessel is around 5° F. Moisture addition during freezing is necessary. Pressure is maintained between 1.25 to 2 atm.

EXAMPLE 5

Recovery of flavors during fruit processing

The temperature in the second of two freezing vessels is kept below 0° F. The freezing is carried out at atmospheric pressure. An increase of the pressure to about 1¼ to 1.5 atmospheres makes it possible to increase the temperature in the last freezing vessel to 5 to 10° F.

It is believed that the method of my invention, the many advantages thereof, as well as the operation of the apparatus for practicing the invention will be understood from the foregoing detailed description. With the present invention it is possible to recover relatively highly concentrated fruit flavors in a way which is simpler than the prior methods, to avoid harmful changes of the fruit flavors, and to ensure good yields. Thus, my invention provides a commercially practicable method for recovering fruit flavors. My invention is particularly adapted to the recovery of such fruit flavors as develop during the processing of fresh fruit products and have not been tried to make use of ever before.

While my process is primarily intended for the recovery of volatile food flavors and particularly volatile fruit flavors, it is not restricted to such uses. It is also applicable where volatile products of low heat resistance in extreme dilute liquid or gaseous solution have to be separated from the solvents for subsequent recovery. The recovery of rose oil from rose water is an example where my process can be applied to great advantage.

It will be apparent that while I have shown and described my invention in a few forms, many changes and modifications may be made without departing from the spirit of the invention defined in the following claims.

I claim:

1. Process for recovering the volatile flavors from fruit juices or the like, introducing a stream of an inert non-condensible gas of a temperature lower than 212° F. into a stripping zone to strip a fruit juice or the like, cooling in several stages the mixture resulting from the stripping action and including gas, water vapor and volatile flavors, the temperature in the first stage being maintained between 32° and approximately 33° F., the temperature in the following stages being below the freezing point of water, the temperature in each of the said following stages being lower than that in the preceding stage, allowing water vapor and the volatile flavors to precipitate in each of said stages, withdrawing the precipitates from said following stages, and recycling the gas to the starting material.

2. In the process according to claim 1, causing the gas to act on said material at a temperature between approximately 80° and 160° F.

3. In the process according to claim 1, causing said resulting mixture to successively pass through the following stages; a cooling zone and at least two freezing zones, the cooling zone being maintained between 32° and approximately 33° F., the freezing zones being maintained between 32° and approximately 0° F.

4. The process according to claim 3, comprising freezing said mixture under superatmospheric pressure.

References Cited in the file of this patent

UNITED STATES PATENTS

| Number | Name | Date |
|---|---|---|
| 981,405 | Fernbach | Jan. 10, 1911 |
| 1,225,226 | Doherty | May 8, 1917 |
| 1,493,756 | LaBour | May 13, 1924 |
| 1,825,707 | Wagner | Oct. 7, 1931 |
| 1,913,294 | Schickt | June 6, 1933 |
| 1,996,852 | Bergel | Apr. 9, 1935 |
| 2,047,935 | Beal | July 21, 1936 |
| 2,087,077 | Wadsworth et al. | July 13, 1937 |
| 2,169,367 | Mills | Aug. 15, 1939 |
| 2,198,848 | Elbe et al. | Apr. 30, 1940 |
| 2,248,634 | Krause | July 8, 1941 |
| 2,423,746 | Zahm | July 8, 1947 |
| 2,427,718 | Denys | Sept. 23, 1947 |
| 2,436,218 | Malcolm | Feb. 17, 1948 |
| 2,453,109 | MacDowell | Nov. 9, 1948 |
| 2,457,315 | Milleville | Dec. 28, 1948 |
| 2,460,859 | Trumpler | Feb. 8, 1949 |
| 2,479,745 | Homiller | Aug. 23, 1949 |
| 2,510,532 | Udale | June 6, 1950 |
| 2,513,813 | Milleville | July 4, 1950 |

OTHER REFERENCES

Food Industries, vol. 21, issue 11, November 1949, pp. 47, 48, 49, 196, 198.